(12) United States Patent
Rossotto et al.

(10) Patent No.: US 8,184,558 B2
(45) Date of Patent: May 22, 2012

(54) METHOD, GATEWAY AND SYSTEM FOR PROVIDING A PUSH-TO-X SERVICE TO A USER OF A DATA TERMINAL

(75) Inventors: Mauro Rossotto, Turin (IT); Stefano Spelta, Turin (IT); Alessandro Perrucci, Turin (IT); Piero Cena, Turin (IT)

(73) Assignee: Telecom Italia S.p.A., Milan (IT)

( * ) Notice: Subject to any disclaimer, the term of this patent is extended or adjusted under 35 U.S.C. 154(b) by 57 days.

(21) Appl. No.: 12/451,750

(22) PCT Filed: May 31, 2007

(86) PCT No.: PCT/EP2007/055364
§ 371 (c)(1),
(2), (4) Date: Apr. 21, 2010

(87) PCT Pub. No.: WO2008/145193
PCT Pub. Date: Dec. 4, 2008

(65) Prior Publication Data
US 2010/0226286 A1 Sep. 9, 2010

(51) Int. Cl.
*H04L 12/16* (2006.01)
(52) U.S. Cl. ........ 370/259; 370/321; 370/328; 370/332; 370/352; 370/469
(58) Field of Classification Search .................. 370/259, 370/321, 328, 332, 352, 469
See application file for complete search history.

(56) References Cited

U.S. PATENT DOCUMENTS

| | | | | |
|---|---|---|---|---|
| 7,035,655 | B2 * | 4/2006 | Maggenti et al. | 455/517 |
| 7,107,017 | B2 * | 9/2006 | Koskelainen et al. | 455/90.2 |
| 7,155,248 | B2 * | 12/2006 | Idnani | 455/519 |
| 7,170,863 | B1 * | 1/2007 | Denman et al. | 370/260 |
| 7,454,206 | B1 * | 11/2008 | Phillips et al. | 455/435.1 |

(Continued)

FOREIGN PATENT DOCUMENTS

EP 1 655 977 A1 5/2006
(Continued)

OTHER PUBLICATIONS

International Search Report from the European Patent Office for International Application No. PCT/EP2007/055364, mailed Apr. 3, 2008.

(Continued)

*Primary Examiner* — Ayaz Sheikh
*Assistant Examiner* — Andrew C Lee
(74) *Attorney, Agent, or Firm* — Finnegan, Henderson, Farabow, Garrett & Dunner, L.L.P.

(57) ABSTRACT

A method of providing a push-to-x service to a user of a data terminal which is connected to a packet-switched network includes, at a gateway interfacing the packet-switched network and the framework supporting the push-to-x service: receiving from the data terminal a request for accessing the push-to-x service; checking a user class to which the user belongs; and, according to the user class, assigning a push-to-x identity to the user either by selecting the push-to-x identity from a set of predefined push-to-x identities, or by retrieving the push-to-x identity from a user profile table; and accessing the framework and the push-to-x service by using the push-to-x identity.

27 Claims, 8 Drawing Sheets

U.S. PATENT DOCUMENTS

| | | | |
|---|---|---|---|
| 7,573,837 B1* | 8/2009 | Mangal et al. | 370/260 |
| 7,616,967 B2* | 11/2009 | Coulas | 455/518 |
| 7,643,437 B2* | 1/2010 | Lee | 370/276 |
| 7,844,244 B2* | 11/2010 | Tu | 455/343.4 |
| 7,941,171 B2* | 5/2011 | Vempati et al. | 455/519 |
| 2002/0077136 A1* | 6/2002 | Maggenti et al. | 455/518 |
| 2004/0249949 A1* | 12/2004 | Gourraud et al. | 709/227 |
| 2006/0067287 A1* | 3/2006 | Kim et al. | 370/338 |
| 2006/0083244 A1* | 4/2006 | Jagadesan et al. | 370/395.2 |
| 2006/0105792 A1* | 5/2006 | Armbruster et al. | 455/517 |
| 2006/0126635 A1* | 6/2006 | Alberth et al. | 370/395.2 |
| 2006/0205427 A1* | 9/2006 | Laible et al. | 455/518 |
| 2006/0211455 A1* | 9/2006 | Choi | 455/567 |
| 2006/0270362 A1* | 11/2006 | Emrich et al. | 455/90.2 |
| 2007/0008960 A1 | 1/2007 | Britsch | |
| 2007/0010272 A1 | 1/2007 | Calviac et al. | |
| 2007/0019623 A1* | 1/2007 | Alt et al. | 370/352 |
| 2007/0054687 A1* | 3/2007 | Akita et al. | 455/518 |
| 2007/0105589 A1* | 5/2007 | Lu | 455/556.2 |
| 2007/0117552 A1* | 5/2007 | Gobburu et al. | 455/414.1 |
| 2008/0045236 A1* | 2/2008 | Nahon et al. | 455/456.1 |
| 2009/0274090 A1* | 11/2009 | Akhtar et al. | 370/328 |

FOREIGN PATENT DOCUMENTS

| | | |
|---|---|---|
| EP | 1 703 712 A1 | 9/2006 |
| EP | 1 737 186 A1 | 12/2006 |
| WO | WO 2004/105413 A1 | 12/2004 |

OTHER PUBLICATIONS

"Push to Talk Over Cellular (PoC)—Architecture," Approved Version 1.0.1, Open Mobile Alliance, pp. 1-8 and 19-21, (Nov. 28, 2006).

* cited by examiner

METHOD, GATEWAY AND SYSTEM FOR PROVIDING A PUSH-TO-X SERVICE TO A USER OF A DATA TERMINAL

CROSS REFERENCE TO RELATED APPLICATION

This application is a national phase application based on PCT/EP2007/055364, filed May 31, 2007.

TECHNICAL FIELD

The present invention relates to the field of telecommunication services. In particular, the present invention relates to a method for providing a push-to-x service to a user of a data terminal. Further, the present invention relates to a gateway for implementing such a method, and to a telecommunication system comprising such a gateway.

BACKGROUND ART

It is known that a "push-to-talk" service (briefly, PTT service) allows a group of users to communicate with each other through a common channel. Typically, each user has a terminal capable of transmitting and receiving voice signals along the common channel. Typically, each terminal is configured in a default state wherein it can only receive voice signals. Besides, each terminal typically has a talk button. When a user wishes to talk, he pushes the talk button of his terminal, so that its terminal sends a talk request to a server. The server may reply to the terminal either with a talk grant or with a talk deny. In the first case (reception of a talk grant), the user is allowed to send a voice signal to the other users through the common channel.

For instance, the OMA Push-To-Talk Over Cellular (POC) standard, version 1.0.1 dated 28 Nov. 2006, Chapter 5, describes a telecommunication system capable of providing the above PTT service to a group of users having respective mobile phones. The telecommunication system described by the OMA standard comprises an IP-based packet-switched telecommunication network and a mobile access network (in particular, a GSM network or a UMTS network) to which users are connected by means of their mobile phones. Further, the IP-based packet-switched telecommunication network supports an IP Multimedia Subsystem (briefly, IMS) cooperating with a POC server. The POC server is in charge of managing groups of users wishing to communicate through the POC service. For accessing the POC server, a mobile phone is provided with a POC client. The POC client is configured to interact with the POC server. In particular, the POC client is configured to transmit talk requests and talk release messages to the POC server, and to receive talk grants and talk deny messages from the POC server. Besides, the POC client is in charge of managing a user contact list stored at the mobile phone, i.e. displaying the contacts on the mobile phone display, modifying the contacts (i.e. adding or removing contacts) and updating the presence status of each contact according to status update messages received from the POC server.

Recently, the PTT service (and in particular, the POC service described by the above cited OMA standard) is used also for allowing a user to exchange contents such as discrete contents (e.g. audio files, text files, video files, pictures, etc.) or streaming contents (e.g. audio streaming, audio/video streaming, etc.) either with other users or with a service provider. The ensemble of the PTT service and these PTT-based content exchange services will be termed "push-to-x services" (or, briefly, PTX services) in the following description and in the claims.

In case of POC-based PTX services, a POC client is therefore also responsible for managing contents exchanged by the user, which are stored at the mobile phone.

Recently, telecommunication service providers feel the need to provide these PIX services not only to users provided with mobile phones, but also to users provided with terminals supporting packet-switched communications. Examples of these terminals, which will be termed "data terminals" in the following description and in the claims, are: personal computers, PDAs, set-top-boxes or phones supporting packet-switched calls, such as VoIP phones.

In the art, solutions are known allowing to extend the PTT service also to terminals other than mobile phones.

US 2006/0105792 discloses a method for providing a push-to-talk service between PTT enabled devices and non-PTT enabled devices. First, the non-PTT enabled device is registered at a PTT interworking agent. Then, signalling data is received at an interface in a first format. The signalling data includes an identifier corresponding to one or more destination phones. Next, the signalling data in the first format is converted to a second signalling protocol at the PTT interworking agent. The push-to-talk signalling information is sent to a push-to-talk server and a destination address is located for each of the one or more phones associated with the signalling data. The signalling data is then routed to the one or more phones.

Further, US 2007/0010272 discloses a gateway between a push-to-talk type network and a second telecommunications network. This gateway includes means for creating a first instance of a first push-to-talk client adapted to communicate with a second push-to-talk client via a first telecommunications network; means for setting up a call with a service provider on a second telecommunications network; and control means adapted to set up a first communications channel between the first instance of the first push-to-talk client and the communications means to set up a logical session between a second push-to-talk client and the service provider.

EP 1 655 977 discloses a method for operating a push-to-talk session between at least a first terminal and a second terminal by use of a push-to-talk server of a cellular radio communications system, wherein data of the push-to-talk session is transferred via the push-to-talk server from the first terminal to the second terminal and vice versa. According to EP 1 655 977, the push-to-talk server processes data of the push-to-talk session in at least a first data format, the cellular radio communications system receives data of the push-to-talk session from the second terminal in at least a second data format and an interworking unit converts data from the second data format into the first data format and vice versa.

SUMMARY OF THE INVENTION

The Applicant has noticed that the above known solutions do not tackle some problems occurring when providing a PTT service (and, more generally, a PTX service) to a data terminal.

First of all, the Applicant has noticed that a data terminal typically does not have any application allowing it to access the IMS supporting the PTX services. Indeed, accessing the IMS requires performing an authentication at the IMS system, i.e. providing an identifier allowing the IMS to identify the user of the data terminal and to retrieve a user profile such as: PTX services subscribed by the user, audio and video formats supported by its data terminal, and so on. On the contrary, a data terminal is typically simply capable of accessing the Internet, which does not require any IMS like authentication operation.

Therefore, a user wishing to access a PTX service by means of its data terminal would disadvantageously have to install on its data terminal a dedicated application suitable to access the IMS by performing an authentication operation, and to interact with the POC server, similarly to the above mentioned POC client.

The Applicant has noticed that even though the known above cited documents disclose to provide a PTT service to a terminal other than mobile phones, such documents do not disclose how such terminal can access the IMS or, more generally, a SIP/IP core network.

Accordingly, the Applicant has tackled the problem of providing a method for providing a PTX service to a user of a data terminal, which allows the data terminal to access the IMS without requiring the installation of any dedicated application onto the data terminal.

According to a first aspect, the present invention provides a method of providing a push-to-x service to a user of a data terminal which is connected to a packet-switched network, wherein the method comprises, at a gateway interfacing the packet-switched network and a framework supporting the push-to-x service: a) receiving from the data terminal a request for accessing the push-to-x service; b) checking a user class to which the user belongs and, according to the user class, assigning a push-to-x identity to the user either by selecting the push-to-x identity from a set of predefined push-to-x identities, or by retrieving the push-to-x identity from a user profile table; and c) accessing the framework and the push-to-x service by using the push-to-x identity.

Preferably, the step b) further comprises, in case the push-to-x identity is selected from the set of predefined push-to-x identities, storing the push-to-x identity for a single session of the push-to-x service. Further, preferably, the step b) comprises, in case the push-to-x identity is retrieved from the user profile table, retrieving from the user profile table the push-to-x identity which has been previously selected by the gateway from the set of predefined push-to-x identities during a gateway registration operation performed by the user. Further, preferably, the step b) comprises, in case the push-to-x identity is retrieved from the user profile table, retrieving from the user profile table the push-to-x identity which is provided by the user to the gateway during a gateway registration operation performed by the user, the push-to-x identity identifying a mobile phone configured for accessing the push-to-x service through a push-to-x client.

Preferably, the step a) comprises receiving a user identifier of the user. Further, preferably, the step a) comprises receiving a streaming content format and/or a discrete content format supported by the data terminal.

Further, according to advantageous embodiments of the present invention, the method further comprises associating to the user a service event channel identifier identifying a service event channel to be used for exchanging at least one signalling message relating to the push-to-x service. Further, according to advantageous embodiments of the present invention, the method further comprises associating to the user a media streaming channel identifier identifying a media streaming channel to be used for exchanging at least one streaming content during the push-to-x service.

Preferably, the method further comprises transmitting a notification message from the gateway to the data terminal for informing the user that the push-to-x service has been accessed.

According to preferred embodiments, the method further comprises transmitting to the data terminal information indicative of at least one contact of the user, the information allowing the data terminal to display the at least one contact. In this case, preferably, the method further comprises: receiving from the framework a presence update information relating to a presence status of the at least one contact; and updating the presence status of the at least one contact according to the presence update information. Optionally, the method further comprises: receiving from the data terminal a request for modifying the at least one contact; and modifying the at least one contact according to the request.

According to preferred embodiments, the method further comprises, during a session of the push-to-x service: receiving a discrete content addressed to the user from the framework; storing the discrete content; transmitting to the data terminal a notification informing the user that the discrete content is available; and upon request from the data terminal, transmitting the discrete content to the data terminal.

According to preferred embodiments, the method further comprises, during a session of the push-to-x service:
  receiving a streaming content addressed to the user from the framework;
  checking whether the data terminal is configured to support a video streaming;
    in the affirmative, checking whether an audio format and a video format of the streaming content are supported by the data terminal;
      in the affirmative, forwarding the streaming content to the data terminal; and
      in the negative, performing a coding of the streaming content and then forwarding the coded streaming content to the data terminal;
    in the negative:
      storing the streaming content;
      transmitting to the data terminal a notification informing the user that the streaming content is available; and
      upon request from the data terminal, transmitting the streaming content in form of a further discrete content to the data terminal.

In such a case, preferably, when the data terminal is not configured for supporting the video streaming, the method further comprises separating an audio component from the streaming content; and forwarding the audio component as a further streaming content to the data terminal.

According to a second aspect, the present invention provides a gateway for interfacing a packet-switched network and a framework supporting a push-to-x service, the gateway comprising: a') a push-to-x service access application configured to receive a request for accessing the push-to-x service from a data terminal of a user, when the data terminal is connected to the packet-switched network; b') an authentication manager configured to check a user class to which the user belongs and, according to the user class, assigning a push-to-x identity to said user either by selecting the push-to-x identity from a set of predefined push-to-x identities, or by retrieving the push-to-x identity from a user profile table and; c') a signalling message interface configured to exchange with the framework at least one signalling message allowing the user to access the push-to-x service by using the push-to-x identity.

Preferably, the authentication manager is further configured to, in case the push-to-x identity is selected from the set of predefined push-to-x identities, store the push-to-x identity for a single session of the push-to-x service. Further, preferably, the authentication manager is further configured to, in case the push-to-x identity is retrieved from the user profile table, retrieve from the user profile table the push-to-x identity which has been previously selected by the gateway from the set of predefined push-to-x identities during a gateway registration operation performed by the user. Further, preferably, the authentication manager is configured to, in case the push-to-x identity is retrieved from the user profile table, retrieve from the user profile table the push-to-x identity which is provided by the user to the gateway during a gateway registration operation performed by the user, the push-to-x identity identifying a mobile phone configured for accessing the push-to-x service through a push-to-x client.

According to preferred embodiments, the gateway comprises a user contact list storing at least one contact associated to the user. In this case, preferably, the gateway further comprises a user contact list access application configured to be invoked by the data terminal and, when invoked, to render a user interface at the data terminal allowing the user to visualize the least one contact.

According to preferred embodiments, the gateway comprises a user folder storing at least one content exchanged by the user during a push-to-x session. In this case, preferably, the gateway further comprises a user folder access application configured to be invoked by the data terminal and, when invoked, to render a user interface at the data terminal allowing the user to visualize the at least one content.

Preferably, the gateway further comprises a push-to-x session set-up application configured to be invoked by the data terminal and, when invoked, to render a user interface at the data terminal allowing the user to request the set-up of a push-to-x session.

Further, preferably, the gateway comprises a service event channel configured to transmit to and receive from the data terminal signalling messages relating to the push-to-x service.

Further, preferably, the gateway comprises a media streaming channel configured to transmit to and receive from the data terminal a first streaming content. Further, preferably, the gateway further comprises a streaming content interface configured to receive from and transmit to the framework a second streaming content.

In this case, preferably, the gateway further comprises a content manager configured to translate the first streaming content into the second streaming content and vice versa.

According to preferred embodiments, the gateway further comprises a discrete content interface configured to receive from and transmit to the framework at least one discrete content.

Preferably, the gateway further comprises a session & service signalling manager configured to perform translation between the at least one signalling message and a further signalling message to be exchanged between the gateway and the data terminal.

According to a third aspect, the present invention provides a telecommunication system comprising: a packet-switched network; a framework supporting a push-to-x service; a data terminal connected to the packet-switched network; and a gateway interfacing the packet-switched network and the framework, wherein the gateway is as set forth above.

BRIEF DESCRIPTION OF THE DRAWINGS

The present invention will become more clear by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
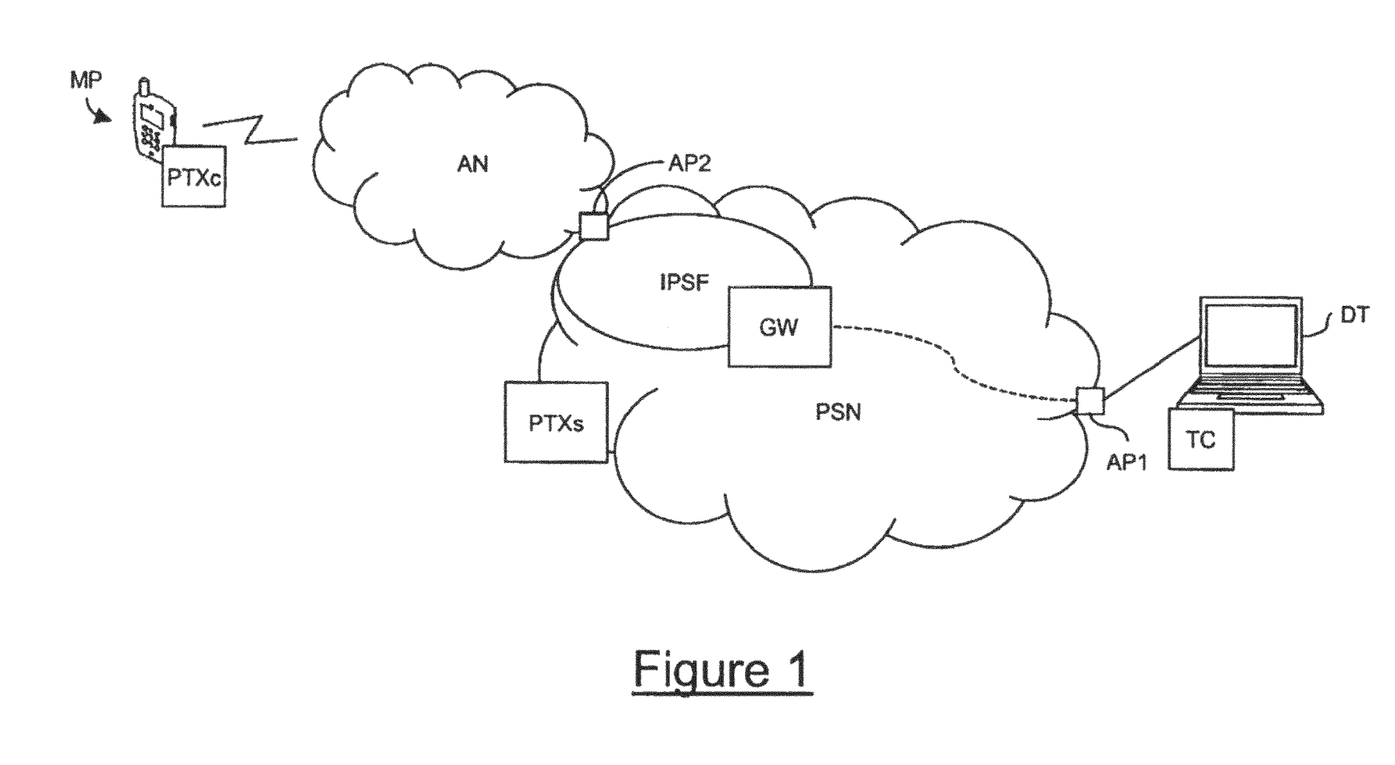
FIG. 1 schematically shows a telecommunication system capable of providing a PTX service to a data terminal, according to an embodiment of the present invention.

FIG. 1 schematically shows a telecommunication system capable of providing a PTX service to a data terminal DT, according to an embodiment of the present invention.

The telecommunication system of FIG. 1 comprises a packet-switched telecommunication network PSN supporting a framework IPSF for delivering PSN multimedia services to users provided with a mobile phone. Preferably, the packet-switched telecommunication network PSN is IP-based, and the framework IPSF is the above cited IP Multimedia Subsystem IMS. Further, the telecommunication system of FIG. 1 comprises a server PTXs configured to provide and manage at least a PTX service and cooperating with the network PSN. Further, the telecommunication system comprises an access network AN (for instance, a GSM or UMTS mobile network) cooperating with the network PSN through the framework IPSF.

The data terminal DT has an application which will be termed "thin client" in the following description, and which is indicated as TC in FIG. 1. The operation of the thin client TC will be explained in further detail herein after.

The data terminal DT is connected to the network PSN through a first access point AP1. As mentioned above, the access point AP1 allowing a data terminal to access a packet-switched network is typically a free access point, and therefore the data terminal DT may use the first access point AP1 for accessing the network PSN.

Further, the telecommunication system of FIG. 1 may comprise a plurality of mobile phones connected to the access network AN. For simplicity, FIG. 1 shows a single mobile phone MP. In order to access PTX services provided and managed by the server PTXs, the mobile phone MP preferably has a client PTXc. The client PTXc is capable of interacting with the server PTXs through a second access point AP2. Since the second access point AP2 is located at the framework IPSF, the second access point AP2 is a protected access point, i.e. access requires authentication both on the framework IPSF and on the server PTXs.

Then, according to embodiments of the present invention, the telecommunication system of FIG. 1 comprises a gateway GW. The gateway GW is preferably responsible of interfacing the framework IPSF and the data terminal DT (in particular, the thin client TC of the data terminal DT), so that the data terminal DT can access the PTX services supported by the framework IPSF.

In the following description, the expression "gateway registration operation" will indicate an operation allowing a user to register himself at the gateway GW. As it will be described in further detail herein after, advantageously, after registration at the gateway GW by a user, the gateway GW permanently stores information about the user such as a user profile, user contacts and contents exchanged by the user.

Further, in the following description the expression "IPSF session" will indicate a session of a PTX service which may be activated by a user after he has registered at the gateway GW. During an IPSF session, a user may activate one or more PTX sessions for exchanging contents with one or more other users, or he can decide whether to join to PTX sessions activated by other users.

By referring to FIG. 2, the detailed structure of the gateway GW according to an embodiment of the present invention will be described.

Figure 2:
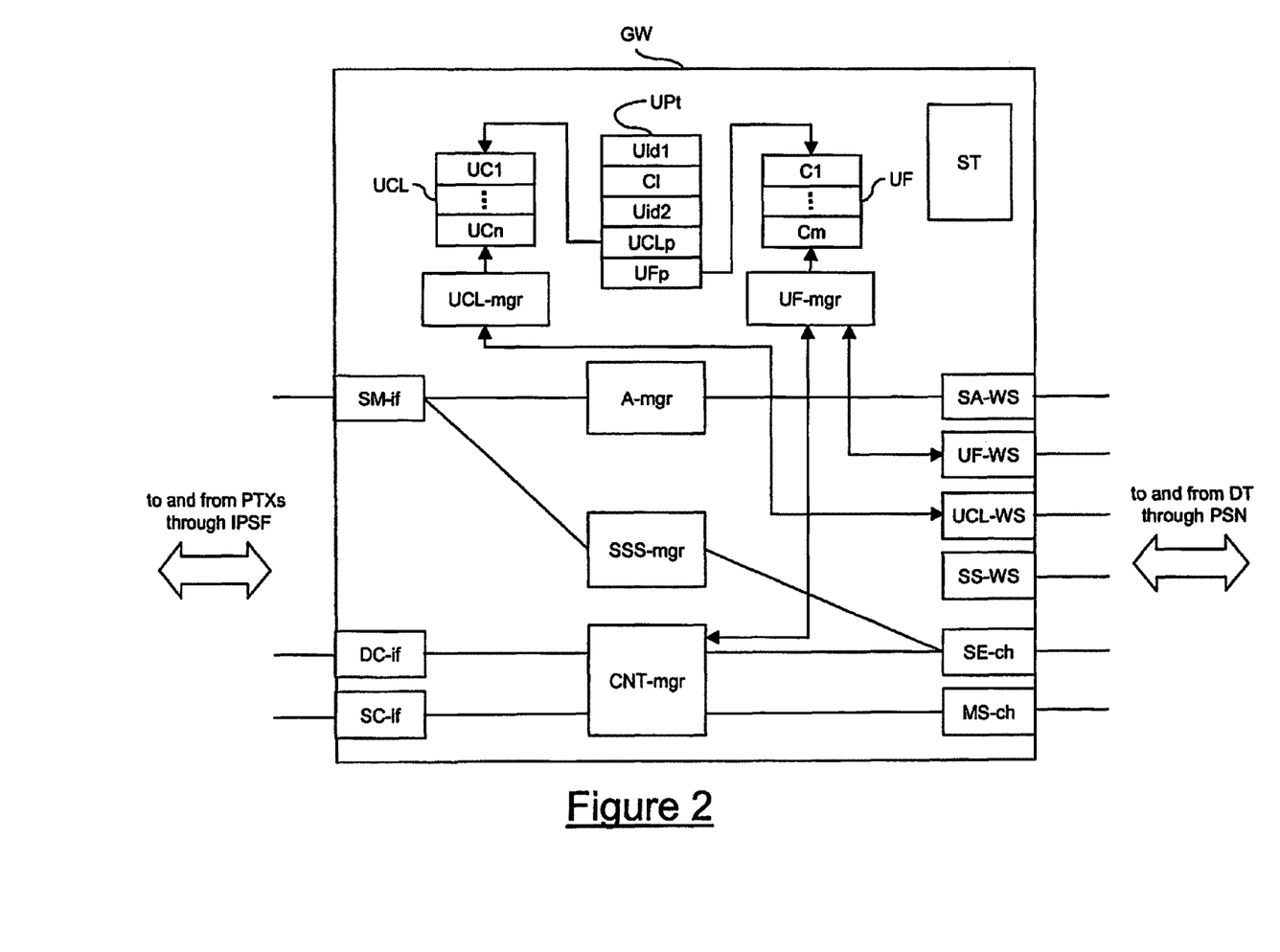
FIG. 2 schematically shows a gateway according to an embodiment of the present invention.

As shown in FIG. 2, the gateway GW preferably comprises:
- a user profile table UPt;
- a user contact list UCL; and
- a user folder UF.

Preferably, the user profile table UPt is in charge of storing information concerning a user which has registered himself at the gateway GW through a gateway registration operation.

Such information preferably comprises a user identifier Uid1. Such a user identifier Uid1 may also be associated to a password. The user identifier Uid1 is assigned to or chosen by the user during the gateway registration operation and the user will have to use it each time he wishes to access the gateway GW for activating an IPSF session, as it will be described in further detail herein after.

Further, such information preferably comprises a user class C1 which identifies the terms of association of PTX identities to the user. Indeed, according to embodiments of the present invention, a user registering himself at the gateway GW may belong either to a first user class (which will be termed in the following description "user class 0"), or to a second user class (which will be termed in the following description "user class 1"), or to a third user class (which will be termed in the following description "user class 2").

A user (identified by a given user identifier Uid1) belonging to the user class 0 is preferably associated to a temporary PTX identity Uid2. Such a temporary PTX identity Uid2 is preferably selected by the gateway GW each time the user requests to activate an IPSF session, and it is temporarily stored in the user profile table UPt until the end of the IPSF session. Accordingly, a user belonging to the user class 0 may access only PTX services which do not require persistency of the PTX identity Uid2 through different IPSF sessions, such as: participation to chat groups, setting up of a PTX session for activating a one-to-one call, setting up of a PTX session for transmitting a content (e.g. a picture or a text message) to another user, and so on.

Further, a user (identified by a given user identifier Uid1) belonging to the user class 1 is preferably associated to a permanent PTX identity Uid2. Such a permanent PTX identity Uid2 is preferably selected by the gateway GW either during the above mentioned gateway registration operation, or the first time the user requests to activate an IPSF session. Upon selection, the gateway GW permanently stores the selected permanent PTX identity Uid2 in the user profile table UPt. After the permanent PTX identity Uid2 has been assigned to the user, each time the user requests to activate an IPSF session the permanent PTX identity Uid2 will be retrieved, as it will be described in further detail herein after by referring to FIG. 3. Accordingly, a user belonging to the user class 1 can access also PTX services which require persistency of the PTX identity Uid2 through different IPSF sessions, such as: participation to PTX sessions involving a predefined group of users, reception of invitations to participate to PTX sessions (i.e. for receiving a call, a picture, a text message, etc.), and so on. However, preferably, the user may access these PTX services only through the gateway GW, since his permanent PTX identity Uid2 is stored only at the gateway GW.

Finally, a user (identified by a given user identifier Uid1) belonging to the user class 2 is also preferably associated to a permanent PTX identity Uid2. However, differently from user class 1, a user belonging to user class 2 has not only a data terminal DT having a thin client TC, but also a further terminal (such as a mobile phone) configured for accessing a PTX service directly (e.g. through a POC client). Therefore, the permanent PTX identity Uid2 is not assigned by the gateway GW, but it corresponds to the PTX identity which is assigned to the user during a provisioning operation which is performed by the PTX service provider. Therefore, during the above cited gateway registration operation, a user belonging to the user class 2 provides such a PTX identity Uid2 to the gateway GW, which permanently stores it in the user profile table UPt. Accordingly, a user belonging to the user class 2 can access PTX services both by a data terminal DT through the gateway GW, and by its further terminal through any other access point of the framework IPSF.

Preferably, the PTX identity Uid2 is a SIPUri or a TELUri.

Further, the user profile table UPt preferably comprises a first pointer UCLp which points to the user contact list UCL and a second pointer UFp which points to the user folder UF.

Preferably, the user contact list UCL stores a list of contacts UC1, ..., UCn. Further, preferably, the user folder UF stores contents C1, ..., Cm exchanged by the user with other users (for instance, the user of the mobile phone MP of FIG. 1) or with a PTX service provider.

As already mentioned, the user profile table UPt is preferably created by the gateway GW during the gateway registration operation. Such a user profile table UPt is preferably permanently stored at the gateway GW until the user de-registers himself from the gateway GW, except the PTX identity Uid2. Indeed, such a PTX identity Uid2 is permanently stored preferably only for users belonging to user class 1 or 2, while for users belonging to user class 0 the PTX identity is temporarily stored only for a single IPSF session.

Besides, the gateway GW preferably comprises, on its IPSF side, one or more of:
- a signalling message interface SM-if;
- a discrete content interface DC-if; and
- a streaming content interface SC-If.

Preferably, the signalling message interface SM-If is configured to receive and transmit signalling messages on the IPSF side of the gateway GW, the signalling messages concerning PTX sessions involving the user of the data terminal DT. Preferably, the signalling messages comprise both signalling messages exchanged for setting up PTX sessions, and signalling messages exchanged for transporting talk requests, talk grants and talk denies. Preferably, the signalling messages exchanged for setting up PTX sessions are based on the SIP protocol (Session Initiation Protocol). Preferably, the signalling messages exchanged for transporting talk requests, talk grants and talk denies are based on the TBCP protocol (Talk Burst Control Protocol) or the MBCP protocol (Media Burst Control Protocol).

Further, preferably, the discrete content interface DC-if is configured to receive and transmit discrete contents on the IPSF side of the gateway GW, the discrete contents being exchanged by the user of the data terminal DT during a PTX session. Preferably, the discrete content interface DC-if is configured to receive and transmit such discrete contents based on the MSRP protocol (Message Session Relay Protocol).

Further, preferably, the streaming content interface SC-if is configured to receive and transmit streaming contents on the IPSF side of the gateway GW, the streaming contents being exchanged by the user of the data terminal DT during a PTX session. Preferably, the streaming content interface SC-if is configured to receive and transmit such streaming contents based on the RTP protocol (Real Time Protocol).

Further, the gateway GW preferably comprises, on its PSN side, one or more of:
- a PTX service access application SA-WS;
- a user folder access application UF-WS;
- a user contact list access application UCL-WS; and
- a PTX session set-up application SS-WS.

Preferably, the PTX service access application SA-WS is configured to be invoked by the thin client TC and, when invoked, to render a user interface at the data terminal DT (for instance, a graphic user interface) allowing the user to request access to a given PTX service, as it will be described in further detail herein after by referring to FIG. 3. Preferably, the PTX service access application SA-WS is a web service.

Preferably, the user contact list access application UCL-WS is configured to be invoked by the thin client TC and, when invoked, to render a user interface at the data terminal DT (for instance, a graphic user interface) allowing the user to visualize and possibly modify the contacts UC1, ..., UCn stored in its user contact list UCL, for instance by adding or removing contacts. Preferably, also the user contact list access application UCL-WS is a web service. Preferably, the contacts UC1, ..., UCn are exchanged between the user contact list access application UCL-WS and the thin client TC in form of XML (Extensible Markup Language) files or in form of html files.

Preferably, the user folder access application UF-WS is configured to be invoked by the thin client TC and, when invoked, to render a user interface at the data terminal DT (for instance, a graphic user interface) allowing the user to visualize and possibly modify the contents C1, ..., Cm stored in its user folder UF. Preferably, also the user folder access application UF-WS is a web service.

Further, preferably, the PTX session set-up application SS-WS is configured to be invoked by the thin client TC and, when invoked, to render a user interface at the data terminal DT (for instance, a graphic user interface) allowing the user to request the set-up of a PTX session (e.g. for activating a one-to-one call with another user, for transmitting a content stored in the user folder UF either to another user or to the server PTXs, etc.). Preferably, also the PTX session set-up application SS-WS is a web service.

Further, the gateway GW preferably comprises, on its PSN side:
- a service event channel SE-ch; and
- a media streaming channel MS-ch.

Preferably, the service event channel SE-ch is a bi-directional channel configured to transmit and receive on the gateway's PSN side signalling messages concerning the user of the data terminal DT. More particularly, the service event channel SE-ch is configured to forward on the PSN side signalling messages addressed to the user of the data terminal DT, which have been transmitted by the server PTXs and which are received at the gateway GW through the signalling message interface SM-if. For instance, such signalling messages may be an invitation to participate to a PTX session, a notification of an incoming one-to-one call, a talk grant, and so on. Preferably, such signalling messages (which, as mentioned above, are received through the signalling message interface SM-if in form of SIP messages) are forwarded through the service event channel SE-ch in form of XML files. Besides, the service event channel SE-ch is configured to receive from the thin client TC signalling messages to be forwarded to the server PTXs. For instance, such signalling messages may be a response to an invitation to participate to a given PTX session, a response to a notification of an incoming call, and so on. Preferably, such signalling messages (which, as mentioned above, are transmitted through the signalling message interface SM-if in form of SIP messages) are received through the service event channel SE-ch in form of XML files.

Preferably, the media streaming channel MS-ch is a bi-directional channel configured to receive and transmit on the gateway's PSN side streaming contents (e.g. audio streaming contents or audio/video streaming contents) exchanged by the user of the data terminal DT during a PTX session. Preferably, the streaming contents are transmitted through the media streaming channel MS-ch through the RTP protocol.

As shown in FIG. 2, the gateway GW further comprises a session table ST. Preferably, the session table ST is in charge of storing, for each IPSF session supported by the gateway GW, a number of IPSF session information, as it will be described in detail herein after by referring to FIG. 3.

Further, the gateway GW preferably comprises:
- an authentication manager A-mgr;
- a session & service signalling manager SSS-mgr;
- a content manager CNT-mgr;
- a user contact list manager UCL-mgr; and
- a user folder manager UF-mgr.

Preferably, the authentication manager A-mgr is configured to receive PTX service access requests from the thin client TC through the PTX service access application SA-WS, and to process such PTX service access requests. The operation of the authentication manager A-mgr will be described in further detail herein after by referring to FIG. 3.

Further, the session & service signalling manager SSS-mgr is preferably configured to perform suitable translations of signalling messages to be forwarded from the IPSF side to the PSN side and vice versa. More particularly, the session & service signalling manager SSS-mgr is configured to receive signalling messages (preferably SIP messages, TBCP messages or MBCP messages) from the signalling message interface SM-if, to translate them (preferably in XML files) and to forward them to the service event channel SE-ch. Similarly, the session & service signalling manager SSS-mgr is configured to receive signalling messages (preferably XML files) from the service event channel SE-ch, to translate them (preferably in SIP messages and TBCP messages or MBCP messages) and to forward them to the signalling message interface SM-if.

Further, the content manager CNT-mgr is preferably configured to perform suitable translations of contents (both discrete and streaming contents) to be forwarded from the IPSF side to the PSN side and vice versa. The operation of the content manager CNT-mgr will be described in detail by referring to FIGS. 6, 7 and 8.

Further, the user contact list manager UCL-mgr is preferably configured to manage information comprised in the user contact list UCL. In particular, the user contact list manager UCL-mgr is preferably configured both to modify the contacts UC1, . . . , UCn according to instructions imparted by the user through the user contact list access application UCL-WS invoked by the thin client TC, and to update the presence status of each contact UC1, . . . , UCn according to update messages received from the server PTXs, as it will be described in further detail herein after by referring to FIG. 4.

Finally, the user folder manager UF-mgr is preferably configured to manage contents stored in the user folder UF, as it will be described in detail by referring to FIGS. 6, 7 and 8.

By referring now to FIG. 3, an operation of activating a IPSF session performed by the user of the data terminal DT according to an embodiment of the present invention will be described in detail.

During a first step 300, the user of the data terminal DT invokes the PTX service access application SA-WS by means of the thin client TC and, through the application SA-WS, he sends to the gateway GW a PTX service access request for a given PTX service. Preferably, during step 300 the user has to provide the user identifier Uid1 and, possibly, a password for accessing the gateway GW. During this step 300, the thin client TC preferably provides to the gateway GW also the formats (i.e. audio formats, video formats, etc.) supported by the data terminal DT for receiving and transmitting streaming contents. Further, optionally, during this step 300, the thin client TC provides to the gateway GW also the formats (i.e. text formats, picture formats, etc.) supported by the data terminal DT for receiving and transmitting discrete contents.

During a successive step 301, the authentication manager A-mgr receives the PTX service access request from the PTX service access application SA-WS, and then it checks the user class C1.

If during step 301 the authentication manager A-mgr determines that the user belongs to the user class 0, it performs a step 302 wherein it associates a temporary PTX identity Uid2 to the user. Preferably, during step 302 the authentication manager A-mgr selects the temporary PTX identity Uid2 from a predefined set of available PTX identities stored at the gateway GW.

On the other hand, if during step 301 the authentication manager A-mgr determines that the user belongs to the user class 1 or 2, it performs a step 303 wherein it retrieves from the user profile table UPt the permanent PTX identity Uid2 which has been selected by the gateway GW (user class 1) or which has been provided by the user (user class 2).

Then, during a successive step 304 a new IPSF session is established with the server PTXs. More particularly, preferably, this step comprises associating to the new IPSF session the following IPSF session information: an IPSF session identifier, an identifier of the service event channel SE-ch which will be used for exchanging signalling messages during the IPSF session, an identifier of the media streaming channel MS-ch which will be used for exchanging signalling messages during the IPSF session, the user class C1 determined by the authentication manager A-mgr during step 301, the PTX identity Uid2 either assigned or retrieved by the authentication manager A-mgr during step 302 or 303, respectively, and the list of the formats which has been provided by the thin client TC during step 300.

Then, during a successive step 305 the session table ST is updated by inserting the above IPSF session information relating to the new IPSF session.

Finally, during a successive step 306, the gateway GW transmits to the thin client TC a notification message informing the user that the IPSF has been successfully activated. Preferably, such a notification message comprises the identifier of the service event channel SE-ch.

Therefore, advantageously, the data terminal DT may access the framework IPSF (and then the PTX services supported by the framework IPSF) without requiring the installation of any dedicated application onto the data terminal.

Indeed, advantageously, the gateway GW shown in FIG. 2 is capable of assigning to a user who does not have a PTX identity of its own (i.e. a user who does not belong to the user class 2) a "virtual" PTX identity, which is either temporarily or permanently stored at the gateway GW. Such a "virtual" PTX identity allows the user to be recognized by the IPSF framework, and therefore the user can use such a "virtual" PTX identity for registering himself on the PTX server and then accessing the PTX services through the gateway GW.

Further, advantageously, the gateway GW of FIG. 2 keeps a storage area for permanently storing the user profile table, the user contact list and the user folder associated to the user. In particular, contacts stored in the user contact list and contents stored in the user folder may be accessed by the thin client TC (and therefore by the user) through suitable applications on the PSN side (i.e. the UCL-WS and the UF-WS), so that the user can visualize them and possibly modify them. This advantageously allows the user to access PTX services without requiring a dedicated application capable of interacting with the server PTXs. Indeed, the thin client TC simply is responsible of performing the following tasks:

opening the service event channel SE-ch;
opening the media streaming channel MS-ch;
invoking the PSN side applications; and
rendering through suitable user interfaces of the data terminal DT the contents exchanged by the user during a PTX session and the information received by the gateway (contacts of the user contact list and contents of the user folder).

Advantageously, these operations may be performed by any application allowing to access a packet-based network (such as Internet), which are typically installed on data terminals. An exemplary thin client indeed is a web browser of a computer. Therefore, no other dedicated applications have to be installed on the data terminal.

Figure 3:
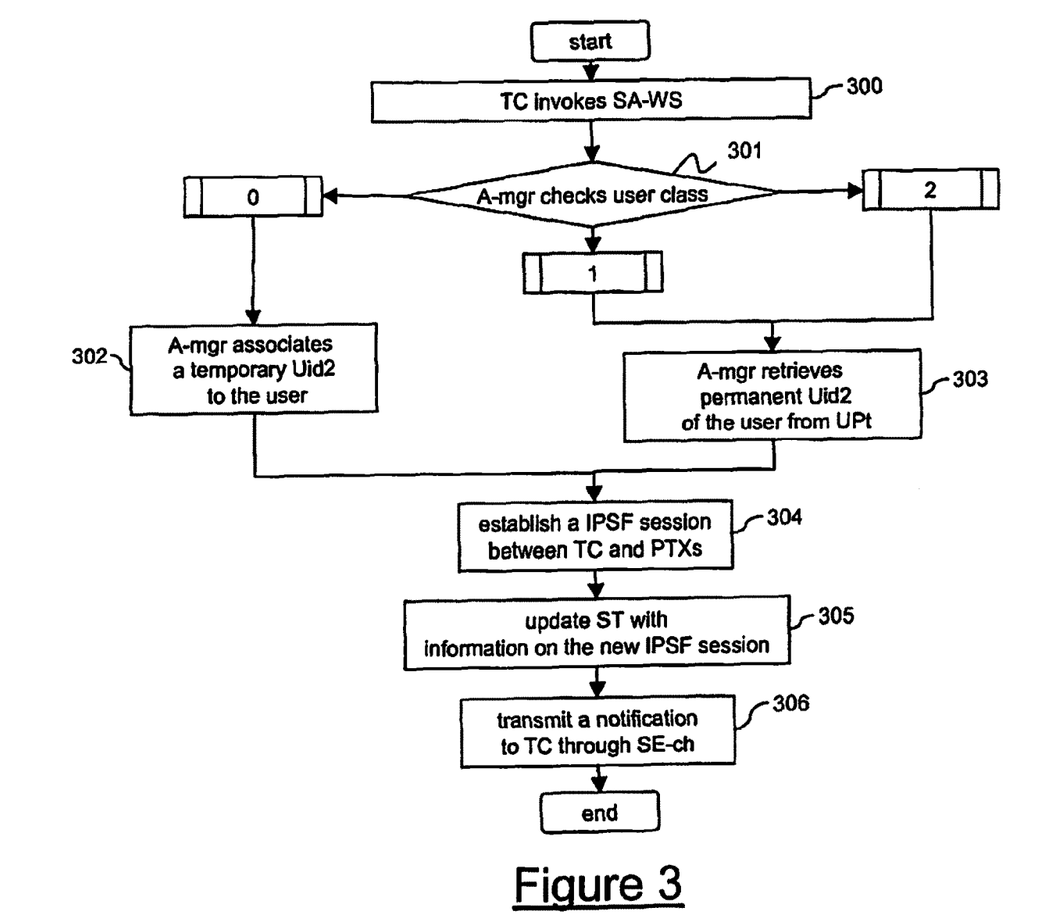
FIG. 3 is a flow chart showing an operation of accessing a PTX service by a data terminal, according to an embodiment of the present invention.
Figure 4:
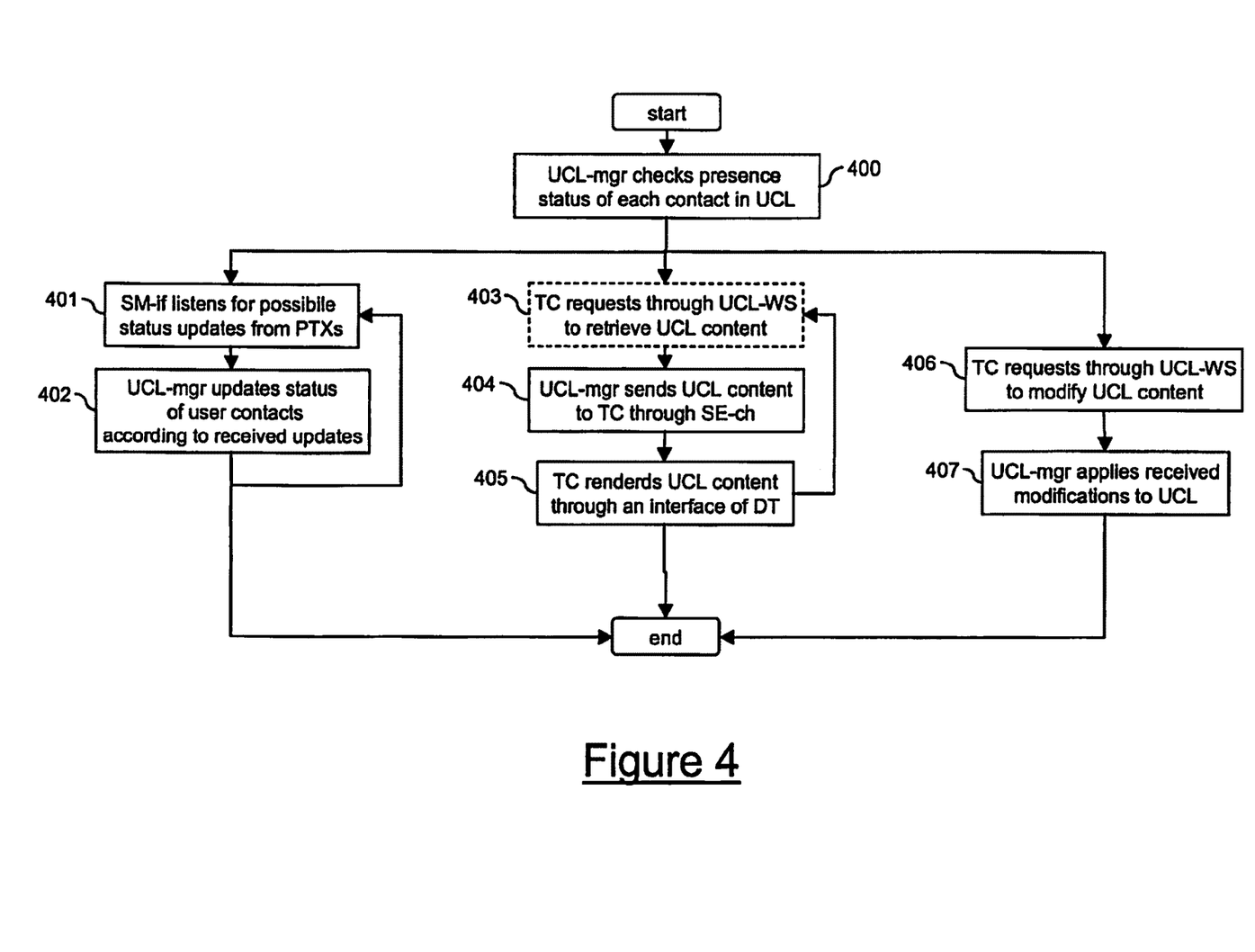
FIG. 4 is a flow chart showing an operation of managing a user contact list, according to an embodiment of the present invention.

FIG. 4 is a flow chart showing the operation of managing the user contact list of a user who has successfully completed the operation of activating an IPSF session shown in FIG. 3, according to an embodiment of the present invention.

When the user has successfully completed the operation of activating an IPSF session shown in FIG. 3, the user contact list manager UCL-mgr accesses the user contact list UCL associated to the user and then checks the presence status of each contact UC1, . . . , UCn stored in the user contact list UCL (step 400). Preferably, the user contact list manager UCL-mgr accesses the user contact list UCL through the user profile table UPt, which allows to associate the user identifier Uid1 with the pointer UCLp.

Then, the signalling message interface SM-if listens for possible update messages comprising information for updating the presence status of the contacts UC1, . . . , UCn and coming from the server PTXs through the framework IPSF (step 401). Preferably, such update messages are received in the form of SIP messages. When the signalling message interface SM-if receives an update message, it forwards it to the session & service signalling manager SSS-mgr, which in turn forwards it to the user contact list manager UCL-mgr. The manager UCL-mgr then updates the presence status of the contacts UC1, . . . , UCn according to the update message content (step 402). Then, step 401 is repeated for listening for further possible update messages.

While step 401 (and possibly step 402) is performed, the user may request to visualize at the data terminal DT the contacts included in its user contact list UCL stored at the gateway GW, and relative presence status. In this case, during a step 403 the thin client TC through the user contact list access application UCL-WS requests to the manager UCL-mgr to receive the contacts and relative presence status included in its user contact list UCL. Step 403 is optional, since the user contact list may be automatically sent to the user of the data terminal DT upon activation of the IPSF session. Then, during a subsequent step 404, the user contact list manager UCL-mgr sends contacts and relative presence status included in the user contact list UCL to the thin client TC through the service event channel SE-ch. As already mentioned, contacts and presence status are transmitted in the form of XML files. When the thin client TC receives contacts and presence status, during a successive step 405 it renders them by means of a user interface (such as a graphic user interface) at the data terminal DT. Optionally, steps 403, 404 and 405 are periodically performed until the IPSF session is concluded, so that the presence status of each displayed contact is updated according to possible update messages received at the gateway GW from the server PTXs.

Further, the user may wish to modify the contacts comprised in the user contact list UCL, e.g. by adding or removing contacts. In this case, during a step 406 the thin client TC sends a modification request to the user contact list manager UCL-mgr through the user contact list access application UCL-WS, the modification request including instruction for modifying the user contact list UCL. Then, the user contact list manager UCL-mgr modifies the user contact list UCL according to the received modification request (step 407).

After the user has successfully activated the IPSF session according to the flow chart shown in FIG. 3, and after he has visualized and possibly modified his contacts according to the flow chart shown in FIG. 4, the user may request to set-up a PTX session, e.g, for activating a one-to-one call with a user selected from its contacts (such as the user of the mobile phone MP shown in FIG. 1) or for sending a content (either a discrete content or a streaming content) to a single user or a group of users selected from its contacts. The various steps of requesting the set-up of a PTX session are shown in the flow chart of FIG. 5a.

Figure 5A:
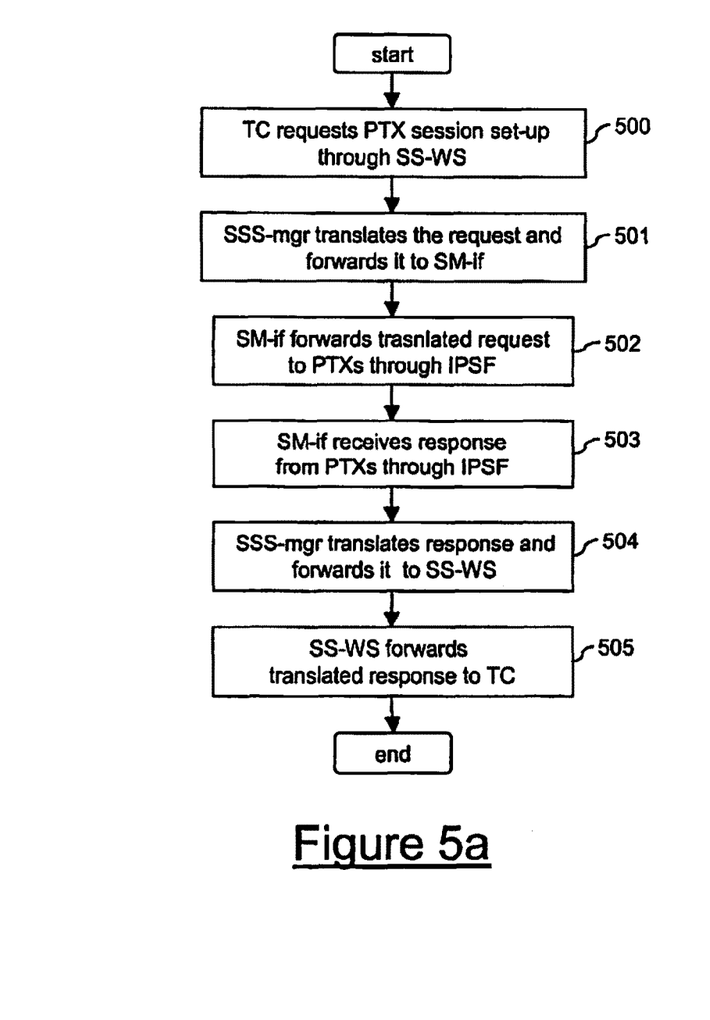
FIGS. 5a and 5b are flow charts showing an operation of setting up a PTX session and of answering to an invitation to participate to a PTX session, respectively, according to an embodiment of the present invention.

In FIG. 5a, during a first step 500 the user sends a PTX session set-up request to the gateway GW by invoking the PTX session set-up application SS-WS through the thin client TC. Such a PTX session set-up request is forwarded to the session & service signalling manager SSS-mgr, which translates it in a format supported at the IPSF side and forwards it to the signalling message interface SM-if (step 501). Preferably, during step 501 the PTX session set-up request is translated in a SIP message. Then, the signalling message interface SM-if forwards the PTX session set-up request to the server PTXs through the framework IPSF (step 502). When the signalling message interface SM-if receives a response from the server PTXs through the framework IPSF (step 503), it forwards the response to the session & service signalling manager SSS-mgr, which translates it in a format supported at the PSN side and forwards it to the PTX session set-up application SS-WS (step 504). Finally, the PTX session set-up application SS-WS forwards the translated response to the thin client TC (step 505). If the response is affirmative (i.e. the other PTX party through the PTXs server accepts the PTX session set-up request), the response preferably comprises an identifier of a media streaming channel MS-ch to be used for exchanging streaming contents during the PTX session.

Figure 5B:
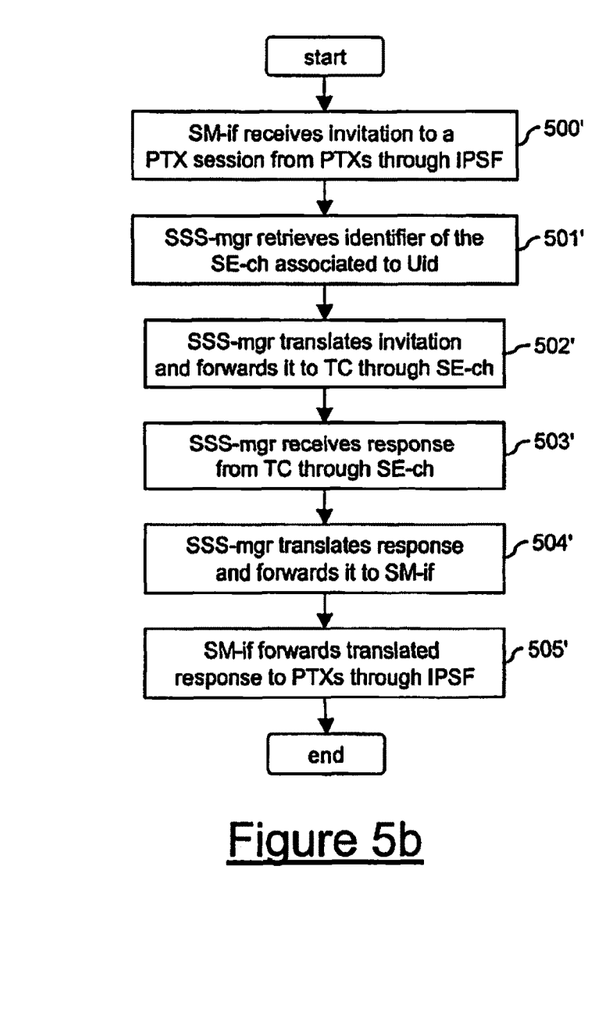

After the user has successfully activated the IPSF session according to the flow chart shown in FIG. 3, and after he has visualized and possibly modified his contacts according to the flow chart shown in FIG. 4, the user may receive an invitation to participate to a PTX session, e.g. from another user wishing to activate a one-to-one call or from the a service provider wishing to transmit a content (either a discrete content or a streaming content) to the user. Again, it is remarked that this situation may occur only when the user belongs to the user class 1 or 2. The various steps of this scenario are shown in FIG. 5b.

During a first step 500', the signalling message interface SM-if receives from the server PTXs through the framework IPSF an invitation to participate to a PTX session. Such a invitation preferably comprises the PTX identity Uid2 of the user to which the invitation is addressed. Then, during a subsequent step 501', the signalling message interface SM-if forwards the invitation to the session & service signalling manager SSS-mgr, which retrieves the PTX identity Uid2 and it uses it for retrieving from the session table ST the identifier of the service event channel SE-ch to be used for transmitting signalling messages to the user (see step 304 shown in FIG. 3). Then, the session & service signalling manager SSS-mgr translates the invitation in a format supported at the PSN side, and it forwards the translated invitation to the thin client TC through the service event channel SE-ch (step 502'). The user may either accept or refuse the invitation. In any case, the user sends a response to the gateway GW through the service event channel SE-ch. When the session & service signalling manager SSS-mgr receives the response through the service event channel SE-ch (step 503'), it translates the response in a format supported at the IPSF side and it forwards it to the signalling message interface SM-if (step 504'). Finally, the signalling message interface SM-if forwards the translated response to the server PTXs through the framework IPSF (step 505').

As already mentioned, during a PTX session the user of the data terminal DT may exchange either discrete contents or streaming contents. FIGS. 6 and 7 show the operation of the gateway GW when it receives from the IPSF side a discrete content or a streaming content, respectively, which is addressed to the user of the data terminal DT.

Figure 6:
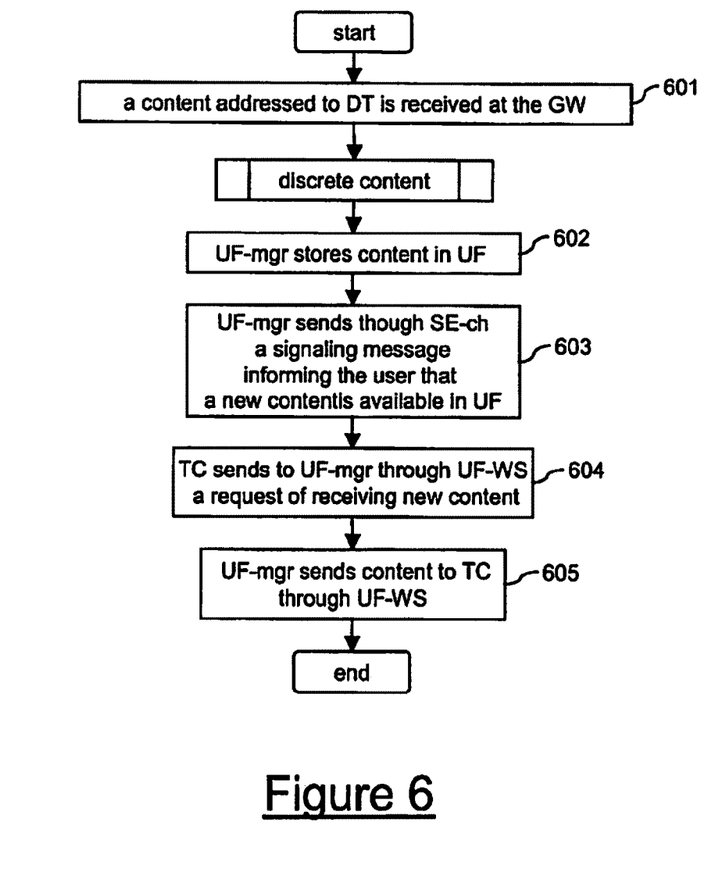
FIG. 6 is a flow chart showing an operation of processing at the gateway of FIG. 2 a discrete content addressed to the data terminal, according to an embodiment of the present invention.

By referring first to FIG. 6 (discrete content), when the discrete content is received at the IPSF side of the gateway GW through the discrete content interface DC-if (step 601), such a discrete content is forwarded to the content manager CNT-mgr and then to the user folder manager UF-mgr, which stores it in the user folder UF (step 602). Then, during a successive step 603 the user folder manager UF-mgr sends to the thin client TC through the service event channel SE-ch a notification informing the user that a new discrete content is available at the user folder UF. If the user is interested in receiving such a content, he operates the thin client TC for invoking the user folder access application UF-WS and transmitting to the user folder manager UF-mgr a request of receiving such a discrete content (step 604). The user folder manager UF-mgr, upon reception of the request, transmits the content to the thin client TC through the user folder access application UF-WS (step 605).

Figure 7:
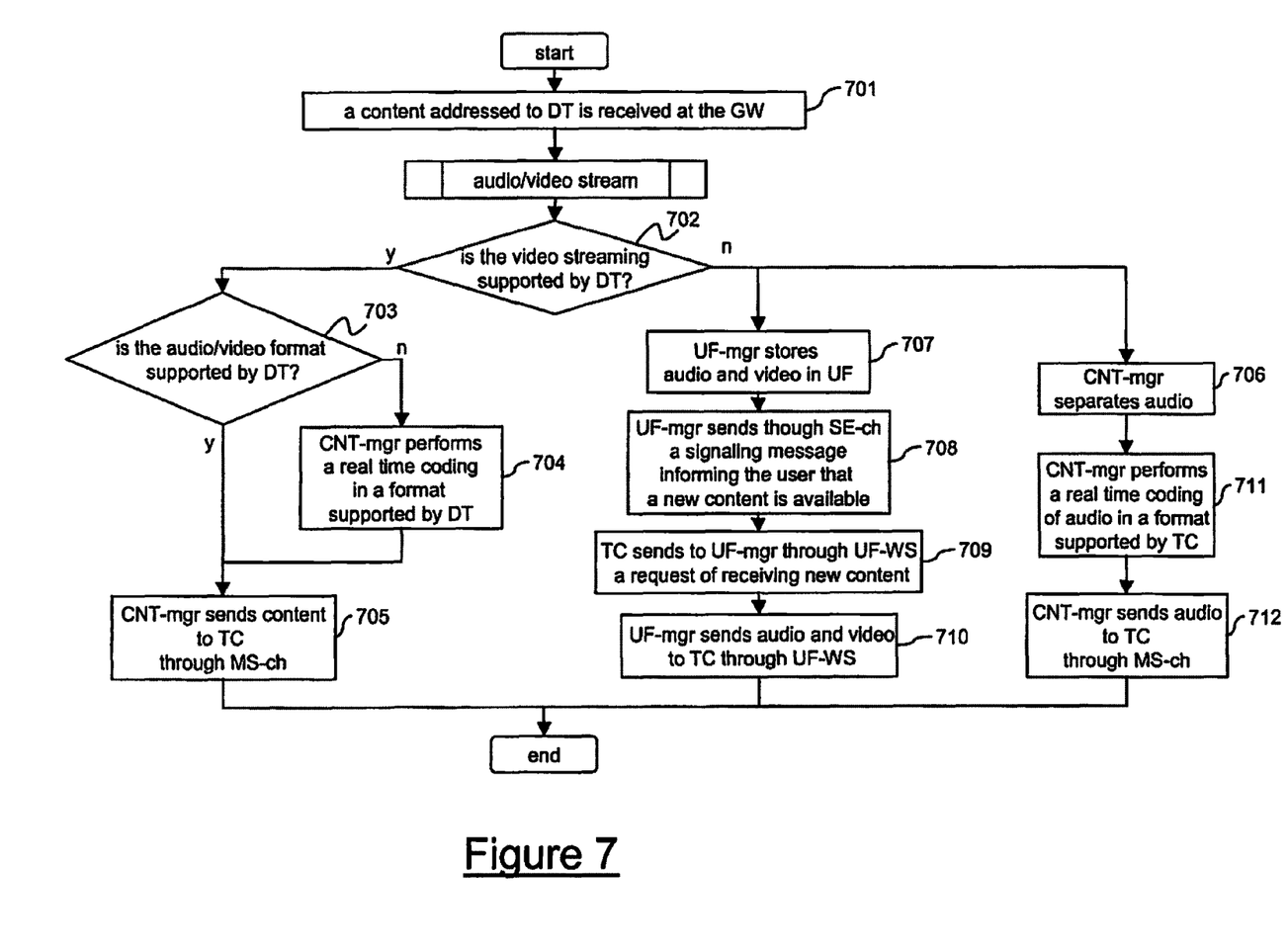
FIG. 7 is a flow chart showing an operation of processing at the gateway of FIG. 2 a streaming content addressed to the data terminal, according to an embodiment of the present invention.

By referring now to FIG. 7, it is assumed that an audio/video streaming content is received at the IPSF side of the gateway GW through the streaming content interface SC-if (step 701). Such a content is preferably forwarded to the content manager CNT-mgr (step 702) which, by accessing the session table ST by means of the user identifier Uid, determines whether the data terminal DT is configured for supporting the video streaming. In the affirmative, the content manager CNT-mgr checks whether the audio format of the audio component comprised in the receiving audio/video streaming content is supported by the data terminal DT (step 703). In the affirmative, the content manager CNT-mgr performs a step 705 wherein it forwards the receiving audio/video streaming content to the thin client TN through the media streaming channel MS-ch substantially in real time. In the negative, before performing the step 705 the content manager CNT-mgr performs a real-time coding of the audio/video content in a format supported by the data terminal DT (step 704).

If, during step 702, the content manager CNT-mgr determines that the data terminal DT is not capable of supporting the video streaming, it separates the audio component from the receiving audio/video streaming content (step 706). Then, the content manager CNT-mgr performs a real-time coding of the audio component in a format supported by the data terminal DT (step 711), and it forwards it to the thin client TC through the media streaming channel MS-ch (step 712).

Parallel to steps 706, 711 and 712, the content manager CNT-mgr forwards the audio/video streaming content to the user folder manager UF-mgr, which stores it in the user folder UF (step 707) and then it transmits to the thin client TC through the service event channel SE-ch a notification informing the user that a new audio/video streaming content has been received (step 708). Then, if the user of the data terminal DT is interested in receiving the audio/video streaming content, the user operates, the thin client TC for invoking the user folder access application UF-WS and transmitting to the user folder manager UF-mgr a request of receiving such a content (step 709). Then, the user folder manager UF-mgr sends the audio/video streaming content in form of a discrete content to the thin client TC through the user folder access application UF-WS (step 710).

Therefore, thanks to the user folder UF which is capable of storing contents at the gateway GW, the user may receive audio/video streaming contents in the form of discrete contents even though the data terminal DT is not capable of supporting video streaming. Indeed, the gateway GW may advantageously forward in real time the audio component only and, at the same time, it may store the audio/video streaming content in the user folder and transmit it to the thin client TC as if it were a discrete content, upon request of the user.

Figure 8:
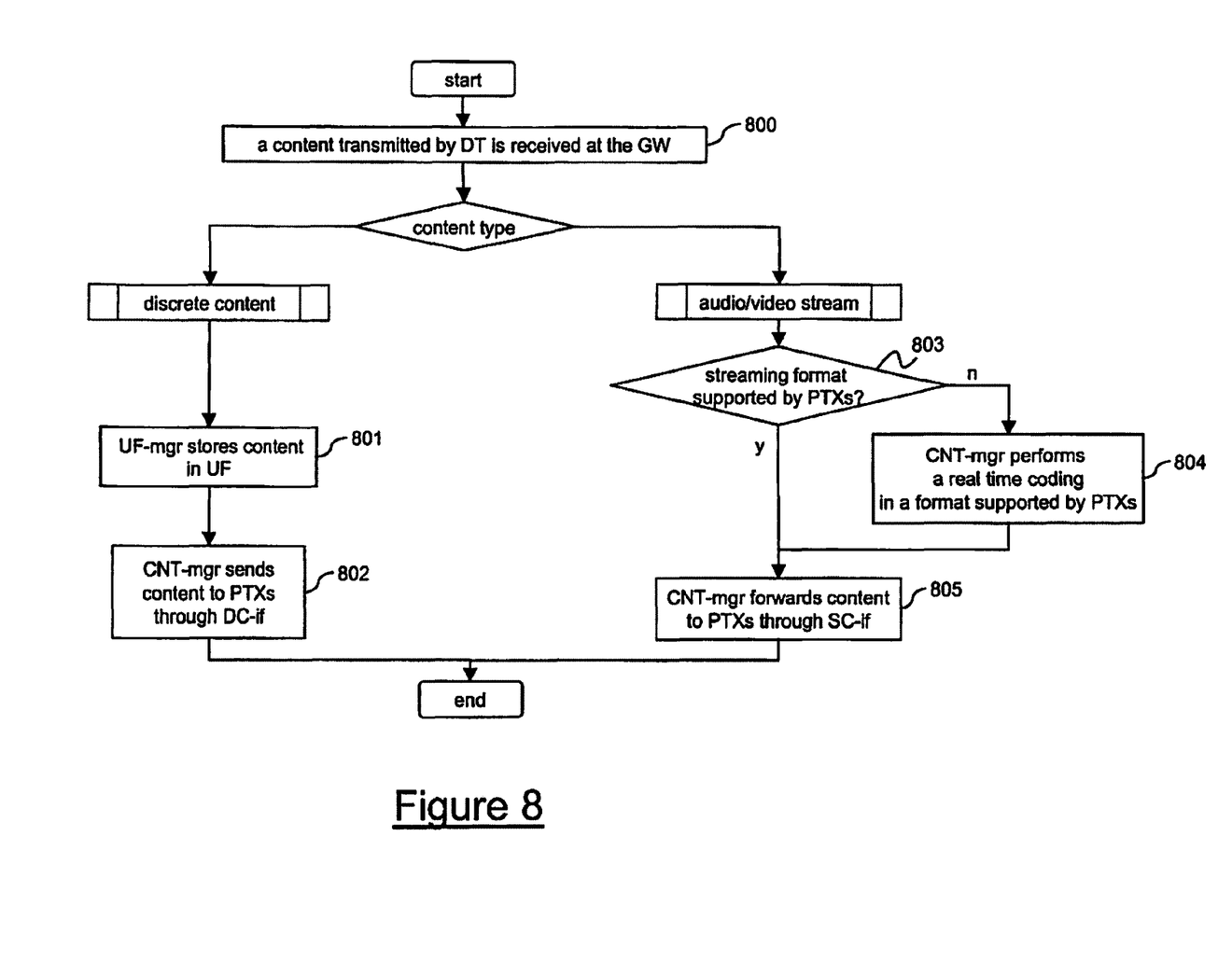
FIG. 8 is a flow chart showing an operation of processing at the gateway of FIG. 2 a content transmitted by the data terminal, according to an embodiment of the present invention.

FIG. 8 shows the operation of the gateway GW of FIG. 2 when it receives from the data terminal DT a content (either a discrete content or a streaming content) to be transmitted to the server PTXs through the framework IPSF.

During a first step 800, the content is received at the PSN side of the gateway GW either through the user folder access application UF-WS (if the content is a discrete content) or through the media streaming channel MS-ch (if the content is a streaming content). If the content is a discrete content, it is forwarded from the user folder access application UF-WS to the user folder manager UF-mgr, which stores it in the user folder UF (step 801). Then, during a subsequent step 802, the content manager CNT-mgr retrieves the content from the user folder UF and it forwards it to the discrete content interface DC-if, which in turn forwards it on the IPSF side of the gateway GW by means of a suitable protocol (preferably, the MSRP protocol).

Otherwise, if the content is an audio/video streaming content, it is firstly checked whether its format is supported by the server PTXs. In the affirmative, the content manager CNT-mgr sends the content to the streaming content interface SC-If which, for instance by means of the RTP protocol, forwards it to the server PTXs through the framework IPSF (step 805). Otherwise, if the format is not supported by the server PTXs, before performing the step 805 the content manager CNT-mgr performs a step 804 of performing a real-time coding of the content in a format supported by the server PTXs (step 804).

The invention claimed is:

1. A method for providing a push-to-x service to a user of a data terminal communicating with a packet-switched network, the method comprising:
    receiving, by a gateway connected to the packet-switched network, from the data terminal a request for accessing a push-to-x service provided by a push-to-x server;
    checking, by the gateway, a user class to which the user belongs; according to the user class, assigning, by the gateway, a push-to-x identity to the user by:
        selecting the push-to-x identity from a set of predefined push-to-x identities, if the user belongs to a first user class; or
        retrieving the push-to-x identity from a user profile table, if the user belongs to a second user class; and
    providing, by the gateway, the data terminal with access to the push-to-x service based on the push-to-x identity.

2. The method according to claim 1, wherein the checking of the user class to which to the user belongs further comprises storing the push-to-x identity for a session of the push-to-x service, when the gateway selects the push-to-x identify from the predefined push-to-x identities.

3. The method according to claim 1, wherein the checking of the user class to which to the user belongs further comprises retrieving from the user profile table, the push-to-x identity that has been previously selected by the gateway from the set of predefined push-to-x identities during a gateway registration operation performed by the user, when the gateway retrieves the push-to-x identity from the user profile table.

4. The method according to claim 1, wherein the checking of the user class to which to the user belongs further comprises retrieving from the user profile table the push-to-x identity that is provided by the user to the gateway during a gateway registration operation performed by the user, when the gateway retrieves the push-to-x identity from the user profile table, the push-to-x identity identifying a mobile phone configured to access the push-to-x service through a push-to-x client.

5. The method according to claim 1, wherein the receiving of the request further comprises receiving a user identifier of the user.

6. The method according to claim 1, wherein the receiving of the request further comprises receiving a streaming content format supported by the data terminal.

7. The method according to claim 1, wherein the receiving of the request further comprises receiving a discrete content format supported by the data terminal.

8. The method according to claim 1, further comprising associating with the user a service event channel identifier identifying a service event channel to be used for exchanging at least one signalling message relating to the push-to-x service.

9. The method according to claim 1, further comprising associating with the user a media streaming channel identifier identifying a media streaming channel to be used for exchanging at least one streaming content during the push-to-x service.

10. The method according to claim 1, further comprising transmitting a notification message from the gateway to the data terminal for informing the user that the push-to-x service has been accessed.

11. The method according to claim 1, further comprising transmitting to the data terminal information indicative of at least one contact of the user, the information allowing the data terminal to display the at least one contact.

12. The method according to claim 11, further comprising:
receiving from the push-to-x server a presence update information relating to a presence status of the at least one contact; and
updating the presence status of the at least one contact according to the presence update information.

13. The method according to claim 11, further comprising:
receiving from the data terminal a request for modifying the at least one contact; and
modifying the at least one contact according to the request.

14. The method according to claim 1, wherein the packet-switched network supports a framework suitable for delivering multimedia services to a user of a mobile phone and for supporting the push-to-x service.

15. A gateway for interfacing a packet-switched network and a push-to-x server providing a push-to-x service, comprising:
a push-to-x service access application configured to receive a request for accessing the push-to-x service from a data terminal of a user when the data terminal is connected to the packet-switched network;
an authentication manager configured to check a user class to which the user belongs and, according to the user class, assigning a push-to-x identity to the user;
selecting the push-to-x identity from a set of predefined push-to-x identities, if the user belongs to a first user class; or
retrieving the push-to-x identity from a user profile table, if the user belongs to a second user class; and
a signaling message interface configured to exchange with the push-to-x server at least one signaling message allowing the user to access the push-to-x service based on the push-to-x identity.

16. The gateway according to claim 15, wherein the authentication manager is further configured to store the push-to-x identity for a session of the push-to-x service, if the authentication manager selects the push-to-x identity from the predefined push-to-x identities.

17. The gateway according to claim 15, wherein the authentication manager is further configured to retrieve from the user profile table the push-to-x identity that has been previously selected by the gateway from the set of predefined push-to-x identities during a gateway registration operation performed by the user, if the authentication manager retrieves the push-to-x identity from the user profile table.

18. The gateway according to claim 15, wherein the authentication manager is further configured to retrieve from the user profile table the push-to-x identity that is provided by the user to the gateway during a gateway registration operation performed by the user, if the authentication manager retrieves the push-to-x identity from the user profile table, the push-to-x identity identifying a mobile phone configured to access the push-to-x service through a push-to-x client.

19. The gateway according to claim 15, further comprising a user contact list storing at least one contact associated with the user.

20. The gateway according to claim 19, further comprising a user contact list access application configured to be invoked by the data terminal to render a user interface at the data terminal, thereby allowing the user to visualize the least one contact.

21. The gateway according to claim 15, further comprising a user folder storing at least one content exchanged by the user during a push-to-x session.

22. The gateway according to claim 21, further comprising a user folder access application configured to be invoked by the data terminal to render a user interface at the data terminal allowing the user to visualize the at least one content.

23. The gateway according to claim 15, further comprising a push-to-x session set-up application configured to be invoked by the data terminal to render a user interface at the data terminal allowing the user to request a set-up of a push-to-x session.

24. The gateway according to claim 15, further comprising a service event channel configured to transmit to and receive from the data terminal, signaling messages relating to the push-to-x service.

25. The gateway according to claim 15, further comprising a media streaming channel configured to transmit to and receive from the data terminal a streaming content.

26. The gateway according to claim 15, wherein the packet-switched network supports a framework suitable for delivering multimedia services to a user of a mobile phone and for supporting the push-to-x service.

27. A telecommunication system comprising:
a packet-switched network;
a push-to-x server providing a push-to-x service;
a data terminal associated with a user and communicating with the packet-switched network; and
a gateway connected to the packet-switched network, the gateway comprising:
a push-to-x service access application configured to receive a request for accessing the push-to-x service from the data terminal through the packet-switched network;
an authentication manager configured to check a user class to which the user belongs and, according to the user class, assign a push-to-x identity to the user by:
selecting the push-to-x identity from a set of predefined push-to-x identities, if the user belongs to a first user class; or
retrieving the push-to-x identity from a user profile table, if the user belongs to a second user class; and
a signaling message interface configured to exchange with the push-to-x server at least one signaling message allowing the user to access the push-to-x service based on the push-to-x identity.

* * * * *